United States Patent
McCormick et al.

(10) Patent No.: US 9,483,743 B1
(45) Date of Patent: Nov. 1, 2016

(54) SYSTEM AND METHOD FOR IMPROVING RECOVERY OF A TELECOMMUNICATIONS NETWORK FROM AN UNSCHEDULED LOSS OF SERVICE USING REPEATABLE REQUIREMENTS FOR APPLICATIONS BY DESIGN CRITICALITY CLASSIFICATION

(75) Inventors: Margaret McCormick, Kansas City, MO (US); Christopher S. Saunderson, Kansas City, MO (US); Retta Whinnery, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1768 days.

(21) Appl. No.: 12/165,106

(22) Filed: Jun. 30, 2008

(51) Int. Cl.
*G06Q 10/00* (2012.01)
*G06Q 10/02* (2012.01)
*G06Q 10/06* (2012.01)

(52) U.S. Cl.
CPC ........ *G06Q 10/02* (2013.01); *G06Q 10/06316* (2013.01)

(58) Field of Classification Search
CPC .................. G06Q 10/00; G06Q 10/06; G06Q 10/063162
USPC ........................ 705/7.11, 7.37; 717/101, 172
See application file for complete search history.

(56) References Cited

U.S. PATENT DOCUMENTS

| | | | |
|---|---|---|---|
| 6,782,421 B1* | 8/2004 | Soles et al. | 709/223 |
| 6,901,347 B1* | 5/2005 | Murray et al. | 702/182 |
| 7,386,585 B2* | 6/2008 | Agrawal et al. | 709/200 |
| 7,725,444 B2* | 5/2010 | Devarakonda et al. | 707/694 |
| 7,830,813 B1* | 11/2010 | Lo et al. | 370/252 |
| 7,885,793 B2* | 2/2011 | Padmanabhan | 703/2 |
| 8,126,756 B2* | 2/2012 | Buco et al. | 705/7.12 |
| 2003/0055672 A1* | 3/2003 | Inoki et al. | 705/1 |
| 2003/0172145 A1* | 9/2003 | Nguyen | 709/223 |
| 2004/0093594 A1* | 5/2004 | Kapadia et al. | 717/170 |
| 2004/0117759 A1* | 6/2004 | Rippert et al. | 717/100 |
| 2004/0194055 A1* | 9/2004 | Galloway et al. | 717/101 |

(Continued)

OTHER PUBLICATIONS

Managing Application Services over Service Provider Networks: Architecture and Dependency Analysis (2000), by G. Kar, A. Keller, S. Calo, Proceedings of the 7th IEEE/IFIP Network Operations and Management Symposium (NOMS 2000), Honolulu, HI, USA, Apr. 2000.*

(Continued)

*Primary Examiner* — Peter Choi
*Assistant Examiner* — Darlene Garcia-Guerra

(57) ABSTRACT

A system provides repeatable requirements for projects designed for criticality. A user interface outputs a list of business requirements for a project to assist in functional requirement selection, outputs a set of general functional requirements associated with an application that is associated with the project for selection, and receives selection of the set of general functional requirements. A server determines a design class for an application based on the selection, wherein the design class is based at least in part on at least one of an upstream application and a downstream application, wherein the application depends on the upstream application, and wherein the downstream application depends on the application. The user interface also outputs specific functional requirements for the application based on the design class for the application, receives selection of the specific functional requirements, and outputs a list of selected specific functional requirements to assist in developing system requirements for the application.

20 Claims, 5 Drawing Sheets

(56) References Cited

U.S. PATENT DOCUMENTS

| | | |
|---|---|---|
| 2004/0243699 A1* | 12/2004 | Koclanes et al. ............. 709/224 |
| 2005/0015641 A1* | 1/2005 | Alur et al. ........................ 714/2 |
| 2005/0102547 A1* | 5/2005 | Keeton et al. .................... 714/1 |
| 2005/0114829 A1* | 5/2005 | Robin et al. ................... 717/101 |
| 2006/0090097 A1* | 4/2006 | Ngan et al. ....................... 714/6 |
| 2006/0117012 A1* | 6/2006 | Rizzolo et al. ................... 707/9 |
| 2006/0129562 A1* | 6/2006 | Pulamarasetti et al. ........ 707/10 |
| 2007/0078988 A1* | 4/2007 | Miloushev et al. .......... 709/227 |
| 2008/0002669 A1* | 1/2008 | O'Brien et al. ............... 370/352 |
| 2008/0178147 A1* | 7/2008 | Meliksetian et al. ......... 717/107 |
| 2008/0243878 A1* | 10/2008 | de Spiegeleer et al. ...... 707/100 |
| 2009/0024425 A1* | 1/2009 | Calvert ............................. 705/7 |
| 2009/0119637 A1* | 5/2009 | Ganapathy ................... 717/101 |
| 2009/0171730 A1* | 7/2009 | Bobak et al. ..................... 705/8 |
| 2009/0172769 A1* | 7/2009 | Bobak et al. ..................... 726/1 |
| 2009/0181665 A1* | 7/2009 | Sater et al. ................... 455/424 |

OTHER PUBLICATIONS

Components and Analysis of Disaster Tolerant Computing, Lawler, C.M.; Harper, M.A. Thornton, M.A.; Performance, Computing, and Communications Conference, 2007. IPCC.*

Recovering Guaranteed Performance Service Connections from Single and Multiple Paultst Anindo Banerjea, Colin J. Parris, and Domenico Ferrari. Tenet Group, Computer Science Division, UC Berkeley and International Computer Science Institute, Berkeley, CA. Email: {banerjea,parris}@tenet.berkeley.edu—0-7803-1820-X/94 $4.00 0 1994 IEEE.*

Kerzner, Harold, "Project Management: A Systems Approach to Planning, Scheduling, and Controlling," 7th Edition, p. 83, John Wiley & Sons, New York, N.Y., 2001.

* cited by examiner

| Design Class | Availability Goal | RTO | RPO |
|---|---|---|---|
| Core Infrastructure | 99.9% | 4 hours | 2 hours |
| Operations Infrastructure | 99.5% | 24 hours | 24 hours |
| Mission Critical | 99.5% | 36 hours | 24 hours |
| Business Critical | 99.3% | 96 hours | 24 hours |
| Enhanced Support | 99.0% | 168 hours | 48 hours |
| Standard Support | 99.0% | 336 hours | 72 hours |
| Historical | Not applicable | 2 weeks | Last Archive Date |

Fig. 2

| Business Critical Functional Requirements |
|---|
| Designate, at an alternate data center, a specified non-production environment to be used as a production environment for the purpose of disaster recovery, for applications and processes designated as Business Critical |
| Provide disk-to-disk backups in an alternate data center for applications and processes designated as Business Critical |
| Ensure no more than 24 hours of data loss for Business Critical processes for the application in the event of a disaster |
| Recover fully all Business Critical processes for the application, within 96 hours of a disaster |

SYSTEM AND METHOD FOR IMPROVING RECOVERY OF A TELECOMMUNICATIONS NETWORK FROM AN UNSCHEDULED LOSS OF SERVICE USING REPEATABLE REQUIREMENTS FOR APPLICATIONS BY DESIGN CRITICALITY CLASSIFICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A product development project is a temporary endeavor undertaken to develop a new product or service. An enterprise may use a product development pipeline to organize and optimize the allocation of resources for a stream of product development projects. Such resources may include time, money, people, materials, energy, space, equipment, communication, quality assurance, and risk tolerance. A product development pipeline consists of a chain of processes and resources arranged so that the output of each element of the chain flows into the input of the next element in the product development pipeline.

SUMMARY

In some embodiments, a system is provided for repeatable requirements for applications based on design for criticality classifications. The system includes a user interface and a server. The user interface outputs a list of business requirements for a project to assist in functional requirement selection, outputs a set of general functional requirements associated with an application that is associated with the project for selection, and receives selection of the set of general functional requirements. The server determines a design class for the application based on the selection, wherein the design class is based at least in part on at least one of an upstream application and a downstream application, wherein the application depends on the upstream application, and wherein the downstream application depends on the application. The user interface also outputs specific functional requirements for the application based on the design class for the application, receives selection of the specific functional requirements, and outputs a list of selected specific functional requirements to assist in developing system requirements for the project.

In some embodiments, a method is provided for developing an application. A design class is determined for the application based at least in part on a projection of a loss that would be incurred when the application goes out of service unexpectedly, wherein the design class is associated with goals of the application for availability and/or recoverability. Whether a design class for an upstream application promotes the application achieving the goals of the application for availability and/or recoverability is determined, wherein the application depends upon functionality provided by the upstream application. The design class of the application and/or the design class of the upstream application is changed based on determining that the design class of the upstream application does not promote the application achieving the goals of the application for availability and/or recoverability. Whether the design class of the application promotes a downstream application achieving goals of the downstream application for availability and/or recoverability is determined, wherein the downstream application depends upon functionality provided by the application. The design class of the application and/or the design class of the downstream application is changed based on determining that the design class of the application does not promote the downstream application achieving the goals of the downstream application for availability and/or recoverability. Functional requirements for the application are generated based in part on selecting some of the functional requirements from a repeatable requirements repository based on the design class of the application. The application is developed based at least in part on the functional requirements.

In some embodiments, a method is provided for developing an application based on repeatable requirements for applications designed for criticality. A list of business requirements for the application is output to assist in functional requirement selection. A plurality of prospective functional requirements for the application selected from a repeatable requirements database is provided to a plurality of application stakeholders. The prospective functional requirements are selected by the application stakeholders. A design class of the application is determined based at least in part on a projection of loss that would be incurred when the application goes out of service unexpectedly, wherein the design class is based at least in part on one of an upstream application and a downstream application, wherein the application depends on the upstream application, and wherein the downstream application depends on the application. A plurality of functional requirements is determined for the application based in part on the prospective functional requirements and on the design class of the application. System requirements are developed for the application based at least in part on the functional requirements for the application.

These and other features and advantages will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 shows an illustrative table of availability and recoverability goals for application design classes according to some embodiments of the present disclosure.

FIG. 3 shows an illustrative table of functional requirements associated with a design class according to some embodiments of the present disclosure.

DETAILED DESCRIPTION

Figure 1:
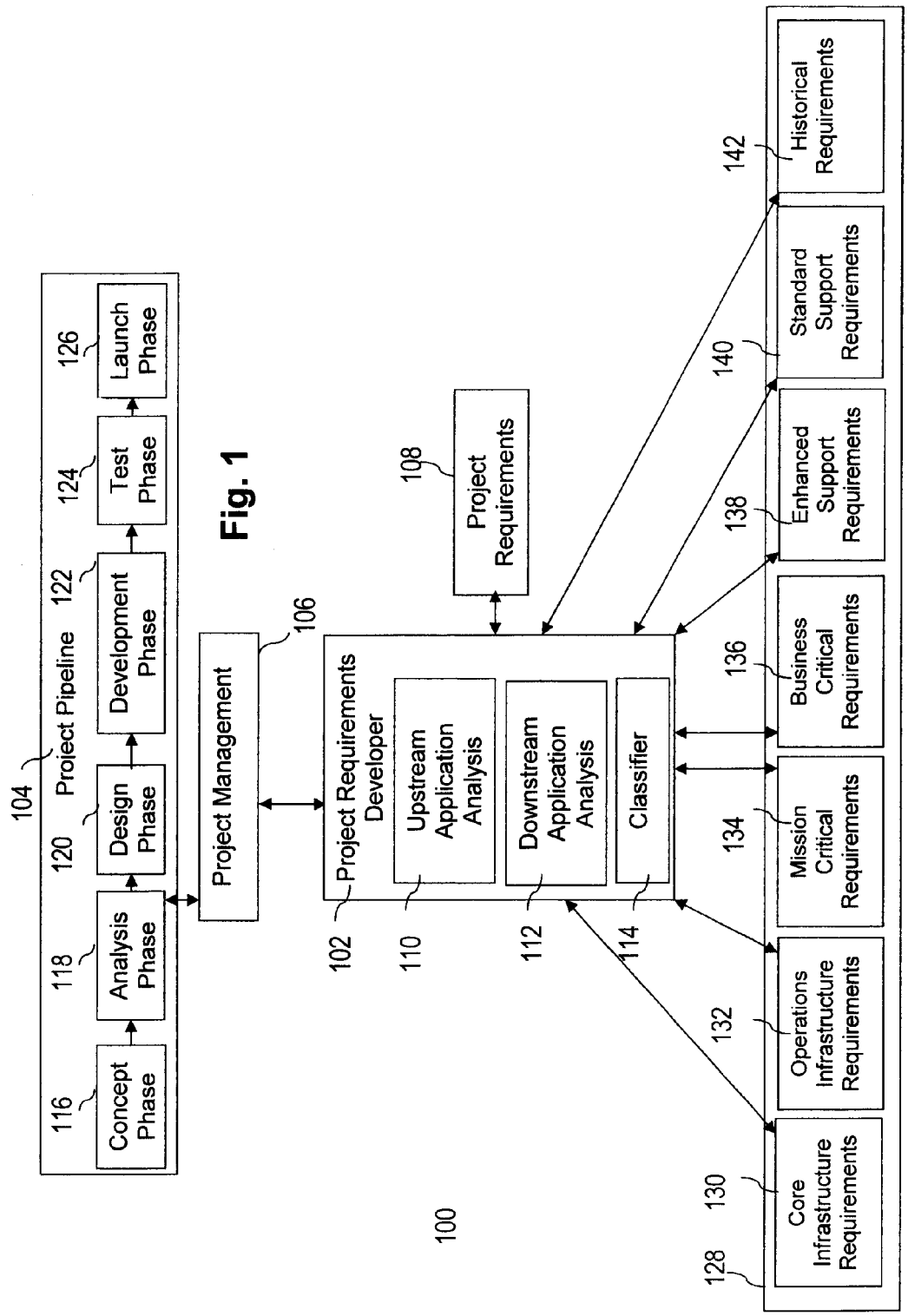
FIG. 1 shows an illustrative project development system according to some embodiments of the present disclosure.

It should be understood at the outset that although an illustrative implementation of one or more embodiments is provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Project managers seldom consider an application's design for criticality classification sufficiently when developing or modifying applications to meet specific business needs. Although disaster recovery requirements are used in this disclosure to illustrate repeatable requirements, the repeatable requirements may also apply to software currency upgrades, cloning applications, and similar types of repeatable requirements. A project manager may request an application business impact assessment to assign or modify the design class from various design classes when designing a system, with more resources required for high criticality design class systems and fewer resources required for low criticality design class systems. Designing a low criticality design class system with slow recoverability times for a developing application may result in excessive loss of enterprise services during an unscheduled loss of service, a disaster, or recovery. Conversely, designing a system to the standards of the high criticality design class for the developing application may result in wasted resources if another system designed for a low criticality design class can sufficiently support the developing application's availability and recoverability goals. Additionally, requiring a project manager to take into consideration every possible design class requirement while beginning to develop an application may result in overlooked requirements due to general unfamiliarity with the detailed requirements for each design class. Furthermore, even when project managers identify all design for criticality requirements for a project and its applications, failure to take into account dependencies, and relationships between the project's applications and other applications may compromise availability and recoverability goals for the project's applications and the other applications. For example, if a project's application depends on the functioning of another application, which may be referred to as an "upstream" application, the failure of the upstream application to recover in the time allotted for recovery of the project's application may result in the project's application not meeting its recoverability goal. Likewise, if another application depends on the functioning of the project's application, the failure of the project's application to recover in the time allotted for recovery of the other application, which may be referred to as a "downstream" application, may result in the downstream application not meeting its recoverability goal. A first application that is upstream from a second application may also be downstream from the second application. For example, if the second application cannot process a transaction without some data from the first application and the first application has to wait for a response from the second application to continue with its processing, then the first application is both upstream and downstream from the second application.

In some embodiments, methods and systems are provided for developing an application. Based on a projection of a loss that would be incurred when the application goes out of service, a design class may be determined for the application, where the design class is associated with the application's availability and recoverability goals. If a design class for an upstream application compromises the application's availability and/or recoverability goals, the design class of the application and/or the design class of the upstream application may be changed by requesting an application business impact assessment. If the design class of the application compromises a downstream application's availability and/or recoverability goals, the design class of the application and/or the design class of the downstream application may be changed by requesting an application business impact assessment. Functional requirements may be generated for the application based on selecting some of the functional requirements from a repeatable requirements repository that correspond to the design class of the application. Rather than requiring a project manager to identify every possible functional requirement for the application, requirements may be retrieved from a repository that lists the functional requirements to ensure consistency for applications with the same design class. Some of the functional requirements may be selected for the application and other functional requirements may be eliminated from consideration. For accountability purposes, the identity of those who request to deviate from the list of functional requirements and the identity of those who approve such requests may be recorded. After systematically determining the appropriate design class for an application, making any necessary change to the design classes of the application and interrelated applications, and selecting functional requirements that are based on the design class for the application, the system requirements for the application may be developed based on the selected functional requirements.

While a detailed embodiment described herein may focus on repeatable requirements for projects that are designed for criticality, one of skill in the art would recognize that many of the benefits of standardized dynamically updating repeatable requirements may also be realized by having repeatable requirements in other areas as well. Other areas that may benefit from such repeatable requirements include inter-process communication requirements, inter-machine communication requirements, processing throughput requirements, database capacity requirements, scalability requirements, maintainability requirements, portability requirements, security requirements, interface support requirements, supportability requirements, and others. The present disclosure also contemplates applying the repeatable requirements teachings to those areas.

FIG. 1 shows an illustrative system 100 for developing projects. The system 100 includes a project requirements developer 102, a project pipeline 104, project management 106, and project requirements 108. The project requirements developer 102 includes upstream application analysis 110, downstream application analysis 112, and a classifier 114. Although in some embodiments the project requirements developer 102 is implemented as one or more applications that execute on a general purpose computer system to automatically take certain actions or process certain data, in other embodiments these actions or activities may be accomplished manually, such as by a user evaluating a paper list, or a spreadsheet template, of project requirements. In other embodiments, these actions may be accomplished partially by hand and partially by the computer.

The project pipeline 104 may include a concept phase 116, an analysis phase 118, a design phase 120, a development phase 122, a test phase 124, and a launch phase 126. In other embodiments, however, the project pipeline 104 may include additional phases and/or combine some of the phases listed separately above. The project management 106 may include application stakeholders, such as project concept initiators, application analysts, application designers, application developers, project testers, project sponsors, and project representatives. The project management 106 also may include pipeline managers who are responsible for managing the project pipeline 104 and requirements managers who assist in identifying and determining the project requirements 108 for each project.

The project requirements 108 may be selected from a repeatable requirements database that lists proposed project requirements based on the design for criticality classifications. The project requirements 108 may include business requirements, functional requirements, and design requirements. For example, a business requirement for a billing project may specify that an application developed for the billing project calculates bills for a new type of customer service when the application is in service. The functional requirement for this project may specify that the application is classified in the business critical design class, whose applications remain in service at least 99.3% of the time. The system requirements for this project may specify the standards for the hardware servers and the software programs that are projected to meet an availability goal of 99.3%.

While a project is flowing through the phases 116-126 of the project pipeline 104, any member of the project management 106, such as a project manager or a pipeline manager, may use the project requirements developer 102 to develop the project requirements 108. If a project's application depends upon the functionality of an upstream application, the upstream application analysis 110 may determine whether the design class of the upstream application (or applications) promotes the project's application achieving their goals for availability and recoverability. If one or more downstream applications depend upon the functionality of the project's application, the downstream application analysis 112 may determine whether the design class of the project's application promotes the downstream application achieving its goals for availability and recoverability. The classifier 114 may be a design for criticality classifier 114 that assists the project management 106 in determining a design class for a project's application based on an application business impact assessment. The classifier 114 may also assist the project management 106 in changing the design class for the project's applications, the design class for upstream applications, and the design class for downstream applications.

Although this example depicts the project requirements developer 102 developing the project requirements 108 during the analysis phase 118, the project requirements developer 102 may develop the project requirements 108 during any and/or all of the phases 116-126. The project requirements 108 may be selected from a set of proposed repeatable requirements based on interviews between the requirements managers and the other members of the project management 106. The project management 106 may evaluate the project requirements 108 for the current phase of the system development life cycle in any order, and may not adopt every one of the project requirements 108 for the current phase of the current project. For example, if a project manager is evaluating the project requirements 108 during the design phase 120 for a project that is developing a billing application, the project manager may not adopt one of the project requirements 108 associated with the design phase 120 for the billing application.

The phases 116-126 are depicted for the purpose of an illustrative example, as the development process of the project pipeline 104 may include any number and type of phases. For example, a general definition of a development process includes a conceptual phase, a planning phase, a definition and design phase, an implementation phase, and a conversion phase. Different types of projects that employ a development process can include engineering projects, manufacturing projects, computer programming projects, and construction projects. For example, the development process for an engineering project can include a start-up phase, a definition phase, a main phase, and a termination phase. Examples of different project phases for different types of projects can be found in Kerzner, Harold, *Project Management: A Systems Approach to Planning, Scheduling, and Controlling*. New York, N.Y., John Wiley & Sons, 2001, 7$^{th}$ Edition. p. 83. HD69.P75 K47 2000.

The system 100 also includes sets 128 of specific functional requirements that correspond to specific design classes. For example, the sets 128 include core infrastructure requirements 130 for applications with the core infrastructure design class, operations infrastructure requirements 132 for applications with the operations infrastructure design class, and mission critical requirements 134 for applications with the mission critical design class. Continuing this example, the sets 128 also include business critical requirements 136 for applications with the business critical design class, enhanced support requirements 138 for applications with the enhanced support design class, standard support requirements 140 for applications with the standard support design class, and historical requirements 142 for applications with the historical, archived, or decommissioned design class. Specific design classes are discussed in greater detail below. Although FIG. 1 depicts seven different types of specific functional requirements 130-142 for seven different types of design classes, the system may include any number and type of specific functional requirements 130-142 for any number and type of design classes.

Turning now to FIG. 2, an illustrative table 200 of availability and recoverability goals for application design classes is depicted according to an embodiment of the present disclosure. An enterprise may identify different categories of design classes for applications based on design for criticality requirements, which in turn are based on availability and recoverability goals for the project's applications. The table 200 includes columns for a design class 202, an availability goal 204, a recovery time objective (RTO) 206, and a recovery point objective (RPO) 208 required to maintain the needs of the business when the application goes out of service unexpectedly.

While FIG. 2 depicts core infrastructure, operations infrastructure, mission critical, business critical, enhanced support, standard support, and historical as examples of the design class 202 for a project, the design class column 202 may include other types of design classes. The core infrastructure design class may be applied to information technology components, including equipment, that together enable all essential voice and data communications and enable mission critical application information capabilities for the enterprise. The operations infrastructure design class may be applied to information technology components that support the operations, management, and monitoring functions of core infrastructure and applications for the enterprise.

The mission critical design class may be applied to applications and/or processes that are vital to the continuing operation of the enterprise. The mission critical applications and processes are essential to deliver and maintain service to customers, such that their loss would immediately impair or disrupt normal business at the enterprise level, or place the enterprise in a state of legal or fiscal jeopardy. The business critical design class may be applied to applications and/or processes that are very important to the business objectives of the enterprise. The business critical applications and processes are essential to provide service assurance and support to customers, such that their loss would immediately impair or disrupt normal business at an unacceptable cost. The enhanced support design class is applied to applications and/or processes that are important to the business operations of the enterprise. The enhanced support applications and processes are generally essential to support internal operations, but their loss would not immediately impair or disrupt normal business at a significant level. The standard support design class is applied to applications and/or processes that are not essential in the short-term to the business operations of the enterprise. The standard support applications and processes generally provide reporting capabilities and information necessary to manage business units, but their loss would have a minimal impact on normal affairs. The historical, or decommissioned, design class is applied to applications and data that have been archived and may be needed for historical reference.

The availability goal 204 is a goal for how often a project's applications are available and potentially functioning. The recovery time objective (RTO) 206 is the grace period, expressed in a number of hours, representing the time window following an unplanned service loss within which a recovery specified by the recovery point objective 208 should be achieved. The recovery point objective (RPO) 208 is expressed as a maximum number of hours of data that will be lost when recovery is achieved within the recovery time objective 206. The table 200 also includes rows 210 of design class data for each of the columns 202-208, wherein each entry in one of the rows 210 corresponds to the other entries in the same row. For example, a project that is classified with the design class 202 of "business critical" corresponds to the availability goal 204 of "99.3%," the RTO 206 of "96 hours," and the RPO 208 of "24 hours."

Turning now to FIG. 3, an illustrative table 300 of functional requirements associated with a design class is depicted according to an embodiment of the present disclosure. The table 300 includes rows 302 of functional requirements for a design class. While FIG. 3 depicts functional requirements for the business critical design class, the table 300 may identify functional requirements for other types of design classes. In this example, one of the rows 302 identifies "provide disk-to-disk backups in an alternate data center for applications and processes designated as business critical" as a functional requirement that the project management 106 may select for a project while developing the project during the design phase 120.

Figure 4:
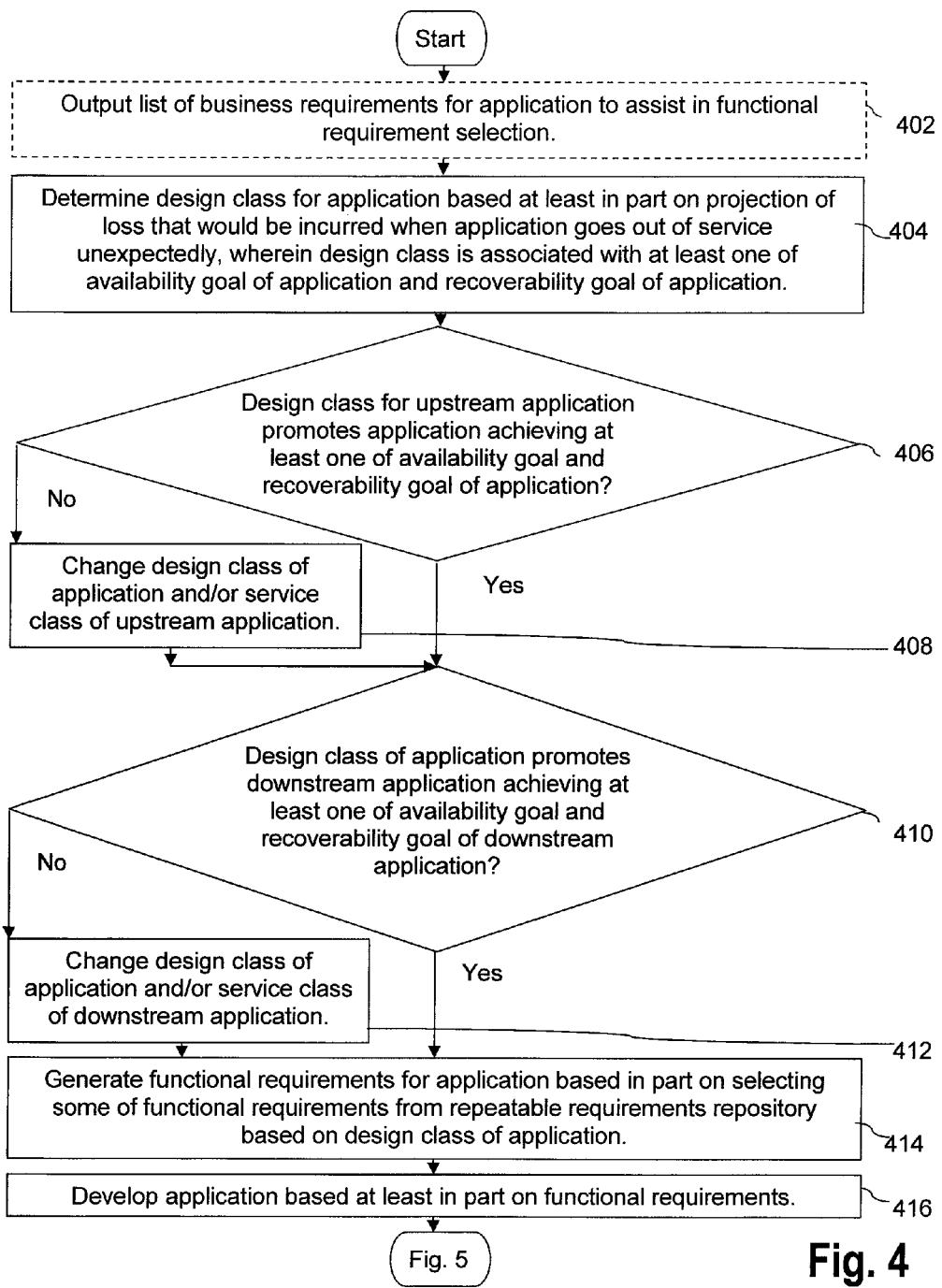
FIG. 4 shows an illustrative application development method according to some embodiments of the present disclosure.

Turning now to FIG. 4, an illustrative application development method is depicted according to an embodiment of the present disclosure. Executing the method enables the project requirements developer 102 to develop an application based on the design class of the application, where the design class is based on upstream and downstream applications.

In box 402, a list of business requirements is optionally output for an application to assist in functional requirement selection. For example, a user interface associated with the project requirements developer 102 outputs a list of business requirements for a billing project that includes a billing application. The list of business requirements may include a requirement that the billing application calculates bills for a new type of customer service. The project management 106 may select this business requirement and develop functional requirements based on this business requirement, or the project management 106 may not adopt this business requirement.

In box 404, a design class is determined for an application based at least in part on a projection of a loss that would be incurred when the application goes out of service unexpectedly, wherein the design class is associated with at least one of an availability goal of the application and a recoverability goal of the application. For example, the project management 106 uses the project requirements developer 102 to identify the business critical design class for the billing application based on input via the user interface. The input via the user interface projects that the loss that would be incurred when the billing application goes out of service would be unacceptable if the billing application has an availability that is less than 99.3%. The billing application is classified as the business critical design class, which meets the availability goal of 99.3%.

The recoverability goal of the billing application is based on a time to recover from being out of service and/or an amount of data lost while out of service. For example, the business critical design class specifies that the billing application has a maximum of 96 hours to recover from being out of service and a maximum of 24 hours of data lost prior to going out of service unexpectedly. Determining the design class for the application may be based at least in part on the upstream application and the downstream application. For example, when the project management 106 needs assistance in determining the design class for the billing application, the project management 106 uses the business critical design class of an upstream application to determine the business critical design class for the billing application. An authority outside the project team, which may be referred to as the application business impact assessment, may be responsible for the actual assignment of a design classification to an application.

The prospective functional requirements for the application may be selected from a repeatable requirements database, provided to the application stakeholders and selected by the application stakeholders. For example, when the application stakeholders or project sponsors need assistance in determining the requirements for a specific design class for the billing application, the application stakeholders evaluate the prospective functional requirements for the billing application that are provided via the user interface from the repeatable requirements database, and select some of the prospective functional requirements via the user interface based on the design class for the billing application. The design class may be determined by requesting an application business impact assessment.

In box 406, whether a design class for an upstream application promotes the application achieving the goals of the application for availability and/or recoverability is determined. For example, the project management 106 uses the project requirements developer 102 to determine that an upstream sales application with an enhanced support design class does not promote the billing application achieving the availability goals of the billing application. The upstream sales application does not promote the goals of the billing application because the upstream sales application has an availability goal of only 99.0% while the billing application has an availability goal of 99.3%. Therefore, the billing application may be available on occasions when the upstream application is unavailable, which may prevent the billing application from functioning properly. If the project management 106 determines that the design class for the upstream application does not promote the application achieving the goals of the application for availability and/or recoverability, the method continues to box 408. If the project management 106 determines that the design class for the upstream application promotes the application achieving the goals of the application for availability and/or recoverability, the method proceeds to box 410.

In box 408, the design class of the application and/or the design class of the upstream application is changed. For example, the project management 106 uses the application business impact assessment to change the design class of the billing application from the business critical design class to the enhanced support design class because the availability goal of the upstream sales application does not promote the billing application's availability goal. Changing the design class of the application and/or the design class of the upstream application may be based on at least one of a cost consideration and a time consideration. For example, changing the design class of multiple upstream applications from the design class of enhanced support to the business critical design class may cost significantly more than changing the design class of the billing application from business critical to enhanced support. However, the requirements for the core infrastructure design class and the operations infrastructure design class may be non-negotiable. For example, if an application is classified as the core infrastructure design class, the requirements for the application will not be modified to another set of requirements no matter how expensive the cost is to change all of the upstream applications to promote the application's availability goals.

In box 410, whether the design class of the application promotes a downstream application achieving goals of the downstream application for availability goal and/or recoverability is determined. For example, the project management 106 uses the project requirements developer 102 to determine whether the business critical design class of the billing application promotes a downstream provisioning application achieving availability goals. If the project management 106 determines that the design class of the application does not promote the downstream application achieving goals of the downstream application for availability and/or recoverability, the method continues to box 412. If the project management 106 determines that the design class of the application promotes the downstream application achieving goals of the downstream application for availability and/or recoverability, the method proceeds to box 414.

In box 412, the design class of the application and/or the design class of the downstream application is changed. For example, the project management 106 uses the application business impact assessment to change the business critical design class of the billing application to the mission critical design class of the downstream provisioning application to ensure that the billing application sufficiently supports the downstream application. Changing the design class of the application and/or the design class of the downstream application may be based on a cost consideration and/or a time consideration. For example, changing the design class of the downstream provisioning application from mission critical to business critical may require significantly more time than changing the design class of the billing application from business critical to mission critical.

In box 414, the functional requirements for the application are generated based in part on selecting some of the functional requirements from a repeatable requirements repository based on the design class of the application. For example, the project management 106 uses the project requirements developer 102 to generate the business critical functional requirements for the billing application based in part on selecting some of the business critical functional requirements from the table 300. The user interface may output the specific functional requirements for the application based on the design class for the application, receive selection of the specific functional requirements, and output a list of selected specific functional requirements to assist in developing system requirements for the project. For example, the user interface associated with the project requirements developer 102 outputs the business critical functional requirements for the billing application, receives selection of some of the business critical functional requirements from the project management 106, and outputs a list of the selected business critical functional requirements to assist the project management 106 in developing hardware and software system requirements for the billing application.

In box 416, the application is developed based at least in part on the functional requirements. For example, the project management 106 develops the billing application based on the selected business critical functional requirements. Developing the application may include maintaining the application. For example, the project management 106 may develop the billing application by maintaining or updating an existing billing application. Developing system requirements for the application is based at least in part on the functional requirements for the application. For example, the project management 106 develops hardware and software system requirements for the billing application based on the business critical functional requirements for the billing application.

Developing the application may include requesting approval to deviate from one of the functional requirements and approving a request to deviate from the one of the functional requirements. For example, the billing project sponsor submits a request via the project requirements developer 102 to secure approval to deviate from the business critical functional requirement that requires a disk-to-disk backup in an alternate data center. A requirements manager in the project management 106 approves the request to deviate from the disk-to-disk functional requirement via the project requirements developer 102 after the requirements manager evaluates the billing project sponsor's proposal to use tape backups. Requesting approval to deviate from one of the functional requirements may be based on a cost consideration and/or a time consideration. For example, the billing project sponsor requests approval to deviate from the disk-to-disk functional requirement to a tape backup based on the cost consideration. An identity of any of the application stakeholders who determines to not adopt at least one of any of the prospective functional requirements for the application and any of the functional requirements for the application that are associated with the design class of the application is recorded and persisted. For example, the project requirements developer 102 records and persists the identity of the billing project sponsor who requested to not adopt the disk-to-disk functional requirement for the billing application and the identity of the requirements manager who approved the request. Not being able to meet a non-negotiable requirement would force an application into a lower design class, which would at the least force the application to the application business impact assessment.

Figure 5:
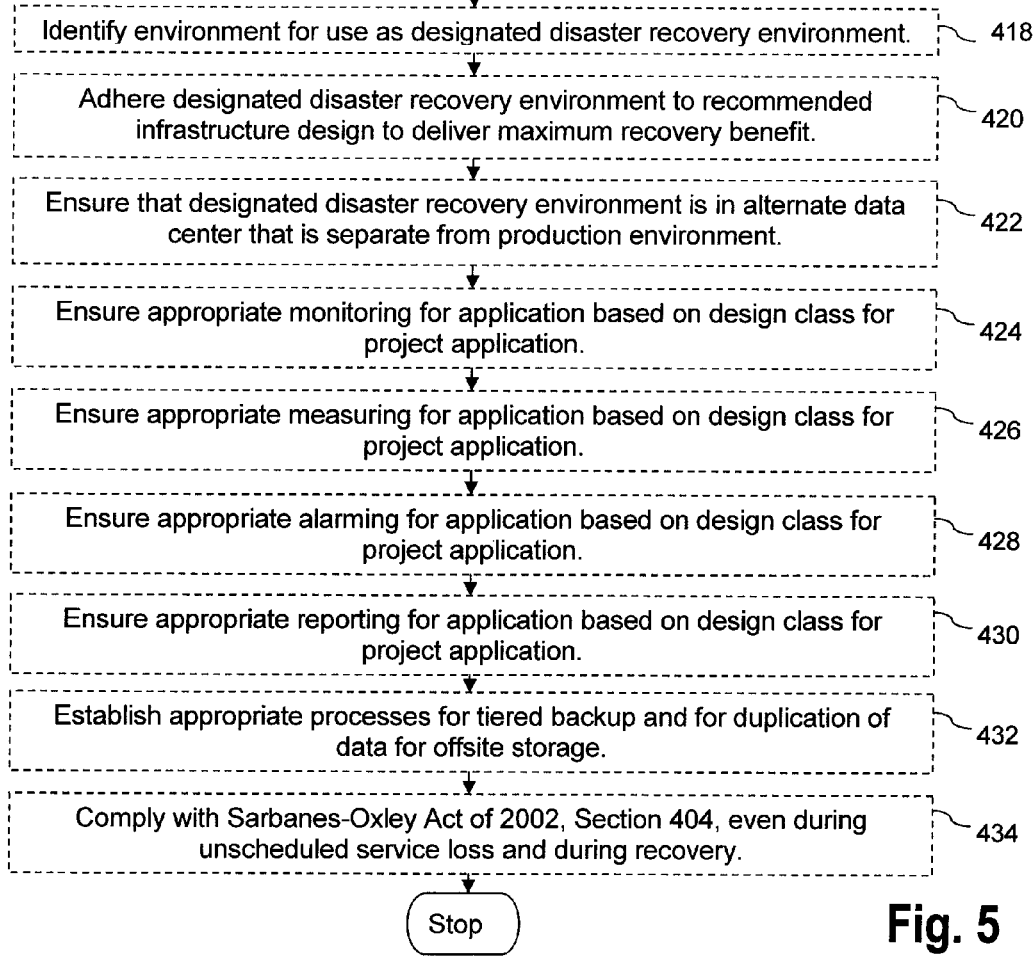
FIG. 5 shows another portion of the illustrative application development method according to some embodiments of the present disclosure.

Turning now to FIG. 5, another portion of the illustrative application development method is depicted according to an embodiment of the present disclosure. Executing the method enables the project requirements developer 102 to apply optional functional requirements to each project to develop applications for each project.

In box 418, an environment is optionally identified for use as a designated disaster recovery environment. For example, the project management 106 uses the project requirements developer 102 to identify a non-production environment for use as a designated disaster recovery environment for the billing application.

In box 420, the designated disaster recovery environment is optionally adhered to a recommended infrastructure design to deliver a maximum recovery benefit. For example, the project management 106 uses the project requirements developer 102 to adhere the designated disaster recovery environment for the billing application to a recommended disaster recovery infrastructure design.

In box 422, the location of the designated disaster recovery environment in an alternate data center that is separate from a production environment is optionally ensured. For example, the project management 106 uses the project requirements developer 102 to ensure that the designated disaster recovery environment for the billing application is not subsequently used as a production environment.

In box 424, appropriate monitoring for the application is optionally ensured based on the design class for the project application. For example, the project management 106 develops the system requirements to ensure that the billing application is monitored frequently enough to promote the 99.3% availability goal for the business critical design class.

In box 426, appropriate measuring for the application is optionally ensured based on the design class for the project application. For example, the project management 106 develops the system requirements to ensure appropriate measuring of data collection and retention for the billing application based on the business critical design class.

In box 428, appropriate alarming for the application is optionally ensured based on the design class for the project application. For example, the project management 106 develops the system requirements to ensure alarming for a manual switchover for the billing application.

In box 430, appropriate reporting for the application is optionally ensured based on the design class for the project application. For example, the project management 106 develops the system requirements to ensure appropriate reporting of monitoring, measuring, and alarming for the billing application based on the business critical design class.

In box 432, appropriate processes for tiered backup and for duplication of data for offsite storage are optionally established. For example, the project management 106 develops the system requirements to establish appropriate processes for tape backup for the billing application based on the approval for the request to not adopt the disk-to-disk backup for the business critical functional requirement.

In box 434, the Sarbanes-Oxley Act of 2002, Section 404, is complied with even during an unscheduled service loss and during recovery. For example, the project management 106 develops the system requirements to insure sufficient corporate accounting both during unscheduled service loss and recovery from the unscheduled service loss.

Figure 6:
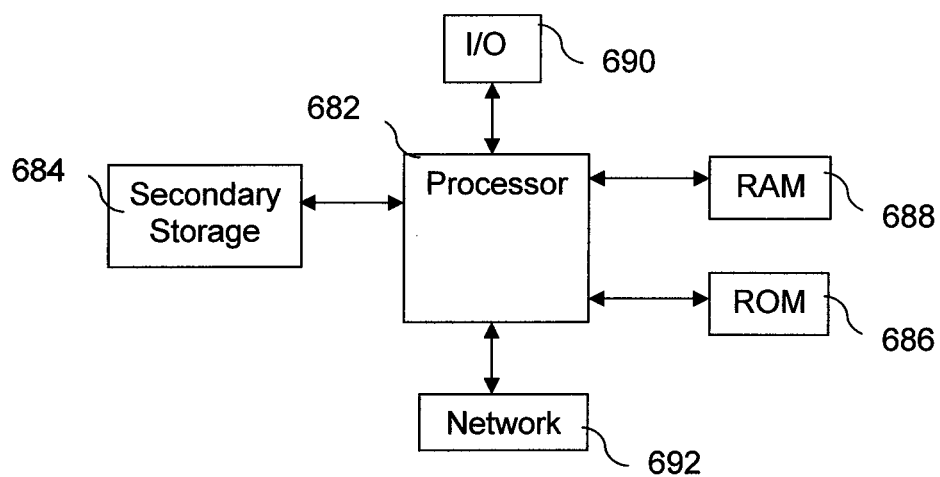
FIG. 6 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for improving recovery of a telecommunications network from an unscheduled loss of service using repeatable requirements for applications based on design for criticality classifications, comprising:
    a computer comprising a non-transitory memory, a user interface, and at least one processor that, upon execution, configures the user interface to:
        output a list of business requirements for a project associated with the telecommunications network that is associated with a plurality of general functional requirements,
        output, for selection based on the list of business requirements, the plurality of general functional requirements associated with a new application that is associated with the project, wherein the new application corresponds with an availability goal input and a recoverability goal that are each particular to the new application,
        receive input of a selection of a subset of general functional requirements for the new application from among the plurality of general functional requirements, and
        receive the availability goal input of the new application, wherein the availability goal input corresponds with a projected loss incurred, from the unscheduled loss of service, that is deemed unacceptable responsive to the new application having an availability that is less than the availability goal input; and
    a server comprising at least one processor, a non-transitory memory, and an application stored in the non-transitory memory that configures the at least one processor upon execution to:
        determine a design class from among a plurality of predetermined design classes for the new application based at least in part on the availability goal input, the subset of general functional requirements for the new application, and the projected loss incurred,
            wherein each design class of the plurality of predetermined design classes corresponds with an availability goal and recovery goal that are each defined by a different set of values, and each design class corresponds with a predefined set of general functional requirements from the plurality of general functional requirements,
            wherein the determined design class for the new application corresponds with a set of values for a determined design class availability goal and a determined design class recovery goal that are respectively associated with the availability goal input and recoverability goal of the new application, and
            wherein the plurality of predetermined design classes comprise a core infrastructure design class, an operations infrastructure design class, a mission critical design class, a business critical design class, an enhanced support design class, a standard support design class, and a historical design class;
        compare a previously determined design class for an upstream application to the determined design class for the new application that determines whether the upstream application promotes the new application achieving the availability goal input and the recoverability goal of the new application,
            wherein the new application depends on functionality provided by the upstream application that corresponds with an upstream application availability goal,
            wherein the upstream application promotes the new application at least by a determination that the availability goal input of the new application is not greater than the upstream application availability goal, and
            wherein promoting the new application improves recovery from the unscheduled loss of service by maintaining functionality of the upstream application;
        compare the determined design class for the new application to a previously determined design class for a downstream application that determines whether the new application promotes the downstream application achieving a downstream application availability goal and a downstream application recoverability goal of the downstream application,
            wherein the downstream application depends on functionality provided by the new application,
            wherein the new application promotes the downstream application at least by a determination that the downstream application availability goal is not greater than the availability goal input, and
            wherein promoting the downstream application improves recovery from the unscheduled loss of service by maintaining functionality of the new application; and
        adjust the determined design class of the new application to another determined design class of the plu rality of predetermined design classes responsive to any of:
- a determination that the upstream application does not promote the new application based on the availability goal input of the new application being greater than the upstream application availability goal, or
- a determination that the new application does not promote the downstream application based on the downstream application availability goal being greater than the availability goal input of the new application,
- wherein the adjustment to the another determined design class results in the upstream application promoting the new application by maintaining functional availability and recoverability responsive to the unscheduled loss of service and the new application promoting the downstream application by maintaining functional availability and recoverability responsive to the unscheduled loss of service,
- wherein, based on the adjustment to the another determined design class for the new application, the user interface outputs specific functional requirements for the new application, receives selection of the specific functional requirements, and outputs a list of selected specific functional requirements for system infrastructure associated with the new application, and
- wherein the new application is developed and executes based on the adjustment to the another determined design class and the specific functional requirements of the list such that functional availability and recoverability of at least the downstream application, the upstream application, and the telecommunications network are maintained and waste in system resources and loss of enterprise services on the telecommunications network are minimized responsive to the unscheduled loss of service.

2. The system of claim 1, wherein the specific functional requirements associated with the core infrastructure design class and the operations infrastructure design class are non-negotiable.

3. The system of claim 1, wherein, based on the list of selected specific functional requirements, the server further receives a deviation that changes the new application from a disk-to-disk backup in an alternate data center to a tape backup that physically actuates according to an association with the new application adjusted to the another determined design class.

4. A method for improving recovery of a telecommunications network from an unscheduled loss of service using repeatable requirements for developing a new application based on design for criticality classifications, comprising:
receiving, by a server executing at least one processor from a computer comprising a user interface and executing at least one processor, an availability goal input for the new application, wherein the availability goal input corresponds with a projected loss incurred, from the unscheduled loss of service, that is deemed unacceptable responsive to the new application having an availability that is less than the availability goal input;
receiving, by the server, a subset of general functional requirements for the new application from among a plurality of general functional requirements retrieved from a repeatable requirements repository;
based on the availability goal input for the new application received by the user interface, determining, by the server, a design class from among a plurality of predetermined design classes for the new application based on the availability goal input, the subset of general functional requirements for the new application, and the projected loss incurred,
- wherein each design class of the plurality of predetermined design classes is associated with a different set of values that correspond with an availability goal and a recoverability goal for the corresponding design class,
- wherein the determined design class for the new application corresponds with a set of values for a determined design class availability goal and a determined design class recovery goal that are respectively associated with the availability goal input and recoverability goal of the new application, and
- wherein the plurality of predetermined design classes comprise a core infrastructure design class, an operations infrastructure design class, a mission critical design class, a business critical design class, an enhanced support design class, a standard support design class, and a historical design class;
comparing, by the server, a previously determined design class of an upstream application with the determined design class for the new application that determines whether the upstream application promotes the new application achieving the availability goal input and the recoverability goal of the new application,
- wherein the new application depends upon functionality provided by the upstream application that corresponds with an upstream application availability goal,
- wherein the upstream application promotes the new application at least by a determination that the availability goal input of the new application is not greater than the upstream application availability goal, and
- wherein promoting the new application improves recovery from the unscheduled loss of service by maintaining functionality of the upstream application;
adjusting, by the server, at least one of the determined design class of the new application and the previously determined design class of the upstream application to another determined design class of the plurality of predetermined design classes, the adjustment being responsive to a determination that the upstream application does not promote the new application based on the availability goal input of the new application being greater than the upstream application availability goal,
- wherein the adjustment to the another determined design class results in the upstream application promoting the new application by maintaining functional availability and recoverability responsive to the unscheduled loss of service;
comparing, by the server, the determined design class of the new application with a previously determined design class for a downstream application that determines whether the new application promotes the downstream application achieving a downstream application availability goal and a downstream application recoverability goal of the downstream application, wherein the downstream application depends upon functionality provided by the new application, wherein the new application promotes the downstream application at least by a determination that the downstream application availability goal is not greater than the availability goal input, and wherein promoting the downstream application improves recovery from the unscheduled loss of service by maintaining functionality of the new application;

updating, by the server, at least one of the determined design class of the new application and the previously determined design class of the downstream application to another determined design class of the plurality of predetermined design classes, the updating being responsive to a determination that the new application does not promote the downstream application based on the downstream application availability goal being greater than the availability goal input of the new application, wherein the updating to the another determined design class results in the new application promoting the downstream application by maintaining functional availability and recoverability responsive to the unscheduled loss of service;

responsive to the adjusting and the updating, generating, by the server, a plurality of specific functional requirements for the new application based in part on selecting some of the specific functional requirements from the repeatable requirements repository based on the another determined design class; and developing the new application based at least in part on the specific functional requirements and the another determined design class, wherein the new application is developed and executes based on the adjustment to the another determined design class and the plurality of specific functional requirements such that functional availability and recoverability of at least the downstream application, the upstream application, and the telecommunications network are maintained and waste in system resources and loss of enterprise services on the telecommunications network are minimized responsive to the unscheduled loss of service.

5. The method of claim 4, wherein developing the new application comprises updating an existing application.

6. The method of claim 4, further comprising:
identifying an environment for use as a designated disaster recovery environment;
adhering the designated disaster recovery environment to a recommended infrastructure design to deliver a maximum recovery benefit; and
ensuring that the designated disaster recovery environment is in an alternate data center that is separate from a production environment.

7. The method of claim 4, further comprising ensuring appropriate monitoring for the new application based on the design class for the project application.

8. The method of claim 4, further comprising ensuring appropriate measuring for the project application based on the design class of the new application.

9. The method of claim 4, further comprising ensuring appropriate alarming for the new application based on the design class of the new application.

10. The method of claim 4, further comprising ensuring appropriate reporting for the new application based on the design class of the new application.

11. The method of claim 4, further comprising establishing appropriate processes for tiered backup and for duplication of data for offsite storage.

12. The method of claim 4, further comprising complying with the Sarbanes-Oxley Act of 2002, Section 404, even during an unscheduled service loss and during recovery.

13. The method of claim 4, wherein developing the new application comprises requesting approval to deviate from one of the functional requirements and approving a request to deviate from the one of the functional requirements.

14. The method of claim 13, wherein requesting approval to deviate from one of the functional requirements is based on at least one of a cost consideration and a time consideration.

15. The method of claim 4, wherein the recoverability goal of the new application is based on at least one of a time to recover from being out of service unexpectedly and an amount of data lost while out of service unexpectedly.

16. The method of claim 4, wherein updating the design class for the new application is based on matching the updated design class for the new application to the design class of the upstream application or the downstream application.

17. The method of claim 4, wherein updating at least one of the design class of the new application, the design class of the upstream application, and the design class of the downstream application is based on at least one of a cost consideration and a time consideration.

18. A method for improving recovery of a telecommunications network from an unscheduled loss of service using repeatable requirements for developing a new application based on design for criticality, comprising:
outputting, by a server executing at least one processor, a list of business requirements for the new application that are associated with a plurality of functionality requirements;
providing, by the server, the plurality of general functional requirements selected from a repeatable requirements database based on the outputted list of business requirements;
receiving input of a selection of a subset of general functional requirements for the new application from among the plurality of general functional requirements, the new application corresponding with an availability goal input and a recoverability goal that are each particular to the new application;
receiving, by the server, the availability goal input of the new application, wherein the availability goal input corresponds with a projected loss incurred, from the unscheduled loss of service, that is deemed unacceptable responsive to the new application having an availability less than the availability goal input;
determining, by the server, a design class from among a plurality of predetermined design classes for the new application based at least in part on the availability goal input, the subset of general functional requirements for the new application, and the projected loss incurred,
wherein each design class of the plurality of predetermined design classes specifies a different set of values that correspond with an availability goal and a recoverability goal for the corresponding design class,
wherein the determined design class for the new application corresponds with a set of values for a determined design class availability goal and a determined design class recovery goal that are respectively associated with the availability goal input and the recoverability goal of the new application, and wherein the plurality of predetermined design classes comprise a core infrastructure design class, an operations infrastructure design class, a mission critical design class, a business critical design class, an enhanced support design class, a standard support design class, and a historical design class;

comparing, by the server, a previously determined design class for an upstream application to the determined design class for the new application that determines whether the upstream application promotes the new application achieving the availability goal input and the recoverability goal of the new application, wherein the new application depends on functionality provided by the upstream application that corresponds with an upstream application availability goal, wherein the upstream application promotes the new application at least by a determination that the availability goal input of the new application is not greater than the upstream application availability goal, and wherein promoting the new application improves recovery from the unscheduled loss of service by maintaining functionality of the upstream application;

comparing, by the server, the determined design class for the new application to a previously determined design class for a downstream application that determines whether the new application promotes the downstream application achieving a downstream application availability goal and a downstream application recoverability goal of the downstream application, wherein the downstream application depends on functionality provided by the new application, wherein the new application promotes the downstream application at least by a determination that the downstream application availability goal is not greater than the availability goal input, and wherein promoting the downstream application improves recovery from the unscheduled loss of service by maintaining functionality of the new application;

adjusting, by the server, the determined design class of the new application to another determined design class of the plurality of predetermined design classes responsive to any of:

a determination that the upstream application does not promote the new application based on the availability goal input of the new application being greater than the upstream application availability goal, or a determination that the new application does not promote the downstream application based on the downstream application availability goal being greater than the availability goal input of the new application, wherein the adjustment to the another determined design class results in the upstream application promoting the new application by maintaining functional availability and recoverability responsive to the unscheduled loss of service and the new application promoting the downstream application by maintaining functional availability and recoverability responsive to the unscheduled loss of service;

determining, by the server, a plurality of specific functional requirements for the new application based on the subset of general functional requirements and on the adjustment to the another determined design class for the new application; and developing system requirements for the new application based at least in part on determining the plurality of specific functional requirements for the new application, wherein the new application is developed and executes based on the adjustment to the another determined design class and the plurality of specific functional requirements such that functional availability and recoverability of at least the downstream application, the upstream application, and the telecommunications network are maintained and waste in system resources and loss of enterprise services on the telecommunications network are minimized responsive to the unscheduled loss of service.

19. The method of claim 18, wherein the new application is based on a previously existing application, and wherein developing the new application comprises updating the previously existing application.

20. The method of claim 18, further comprising recording and persisting an identity of any of the application stakeholders who determines to not adopt at least one of any of the prospective functional requirements for the new application and any of the functional requirements for the new application that are associated with the design class of the new application.

* * * * *